US006065743A

United States Patent [19]

Roudier et al.

[11] Patent Number: 6,065,743

[45] Date of Patent: May 23, 2000

[54] DEVICE FOR HOLDING, POSITIONING OR CLAMPING

[75] Inventors: Fabrice Roudier, Juziers; Michel Morel, Ermont, both of France

[73] Assignee: Genus Technologies, Chatillon, France

[21] Appl. No.: 09/168,077

[22] Filed: Oct. 8, 1998

[30] Foreign Application Priority Data

Oct. 8, 1997 [FR] France .................................. 97 12535

[51] Int. Cl.$^{7}$ ...................................................... B23Q 3/08

[52] U.S. Cl. ................................ 269/32; 269/31; 269/60; 269/228

[58] Field of Search ............................... 269/32, 228, 31, 269/58, 60, 27, 25, 307; 92/13.8

[56] References Cited

U.S. PATENT DOCUMENTS

| | | | |
|---|---|---|---|
| 3,116,058 | 12/1963 | Blatt | 269/31 |
| 3,948,502 | 4/1976 | Waller et al. | 269/27 |
| 4,723,767 | 2/1988 | McPherson et al. | 269/32 |
| 4,793,602 | 12/1988 | McPherson . | |
| 4,799,657 | 1/1989 | Miller | 269/24 |
| 5,013,015 | 5/1991 | Fatheree | 269/24 |
| 5,704,600 | 1/1998 | Robinson . | |

FOREIGN PATENT DOCUMENTS

| | | |
|---|---|---|
| 0 359 073 | 3/1990 | European Pat. Off. . |
| 0 575 888 | 12/1993 | European Pat. Off. . |
| 37 05 269 | 8/1987 | Germany . |
| 89 09 688 | 1/1991 | Germany . |
| 196 16 441 | 6/1997 | Germany . |

*Primary Examiner*—David A. Scherbel
*Assistant Examiner*—Benjamin Halpern
*Attorney, Agent, or Firm*—Young & Thompson

[57] ABSTRACT

A device for holding, positioning or clamping, particularly for the holding, positioning or clamping of pieces of auto body work, comprises a housing 1 containing a movable device 3 displaceable in translation under the action of an actuator 5, and an arm 4 for gripping or holding. The movable device 3 and the rod 8 of the actuator 5 are connected by an adjustable length device. A connection member 12 is screw threaded at one end, to coact with a tapping 9 of the rod 8 of the actuator.

3 Claims, 4 Drawing Sheets

DEVICE FOR HOLDING, POSITIONING OR CLAMPING

This application corresponds to French application 97 12535 of Oct. 8, 1997, the disclosure of which is incorporated herein by reference.

BACKGROUND OF THE INVENTION

The invention relates to a device for holding, positioning or clamping, particularly for holding, positioning or clamping members during auto body work, of the type comprising a housing containing a movable device displaceable in translation under the action of an actuating jack and a clamping or holding member.

DESCRIPTION OF THE RELATED ART

Known devices of this type are for example devices for pneumatic clamping with a knee piece, generally constituted by a hydraulic or pneumatic jack whose rod is connected to a crank shaft and connecting rod assembly secured to the clamping or holding arm.

It is also known to use in place of a hydraulic or pneumatic jack, a remote actuating means, transmitting forces for example by means of a cable or other suitable connection means adapted to transmit force.

Blocking the clamping or holding arm in a clamping or holding position is carried out generally in a position in which the clamping arm is substantially perpendicular to the thrust axis of the actuating means.

These devices of known type are made to order for specific applications as a function of the paths or clamping or holding angles, and of the paths or opening and freeing angles for the pieces to be held.

When modifications must be carried out on these known devices, to obtain for example courses or clamping or holding angles or for releasing or opening, that are different, it is necessary to interpose abutments in the jack body, or to modify the device by taking apart and replacing certain pieces.

To avoid complete disassembly, it can also be provided to interpose an adjustment member with reverse screw threads such as the adjustment screw 30 of U.S. Pat. No. 4,793,602. However, in this case, the housing cannot be sealed against impurities, because the access hole to the adjustment screw 30 must necessarily be provided. The absence of sealing of the housing thus leads to clogging which can result in blocking this adjustment screw 30.

SUMMARY OF THE INVENTION

The invention has for its object to overcome the drawbacks of the prior art, by providing a new sealed blocking device and permitting the adjustment of the courses or the mentioned angles without disassembling or reconstructing the device, whilst offering high precision of adjustment of the holding and release of the pieces to be held.

The invention thus permits decreasing the number of designs necessary, simplifying the production and adjustment of the devices and permitting interchangeability of the designs of the same capacity, which leads to large savings because of the decrease of the need for storage resulting therefrom.

The invention has for its object a device for holding, positioning or clamping, particularly for the holding or clamping of pieces of auto body work, of the type comprising: on the one hand, a housing sealed from impurities and containing a movable linkage displaceable in translation under the action of an actuating means and, on the other hand, a clamping or holding member, characterized in that the movable linkage and the rod of the actuating means are connected by means of a length that is adjustable by relative screwing of the actuating means in its entirety about the axis of translation of the movable linkage.

According to other characteristics of the invention:

the rod of the actuating means is tapped and the movable device is secured to a screw threaded connection member at one end, to permit adjustment of the length by relative screwing of the tapping of said rod about the screw threaded end of the connection member, the connection member is connected to the movable device by an anti-rotation mounting, the connection member is shaped to coact with a means for the detection of the position of clamping or holding, the connection member has a flag adapted to be detected by suitable means secured to the housing of the device, the rod of the actuating means is mounted in the actuating means by an anti-rotation mounting, for example by being secured to an oblong or rectangular piston, the rod of the actuating means is shaped to coact with a detection means for the position of freeing or opening, said rod carries a flag adapted to be detected by a suitable means secured to the housing of the device, at least one of said suitable detection means secured to the housing of the device is a contactless detection means, preferably inductive, suitable detection means are mounted in a same detection module.

BRIEF DESCRIPTION OF THE DRAWING

The invention will be better understood from the description which follows, given by way of non-limiting example, with reference to the accompanying drawings, in which.

DESCRIPTION OF THE PREFERRED EMBODIMENT

Figure 1:
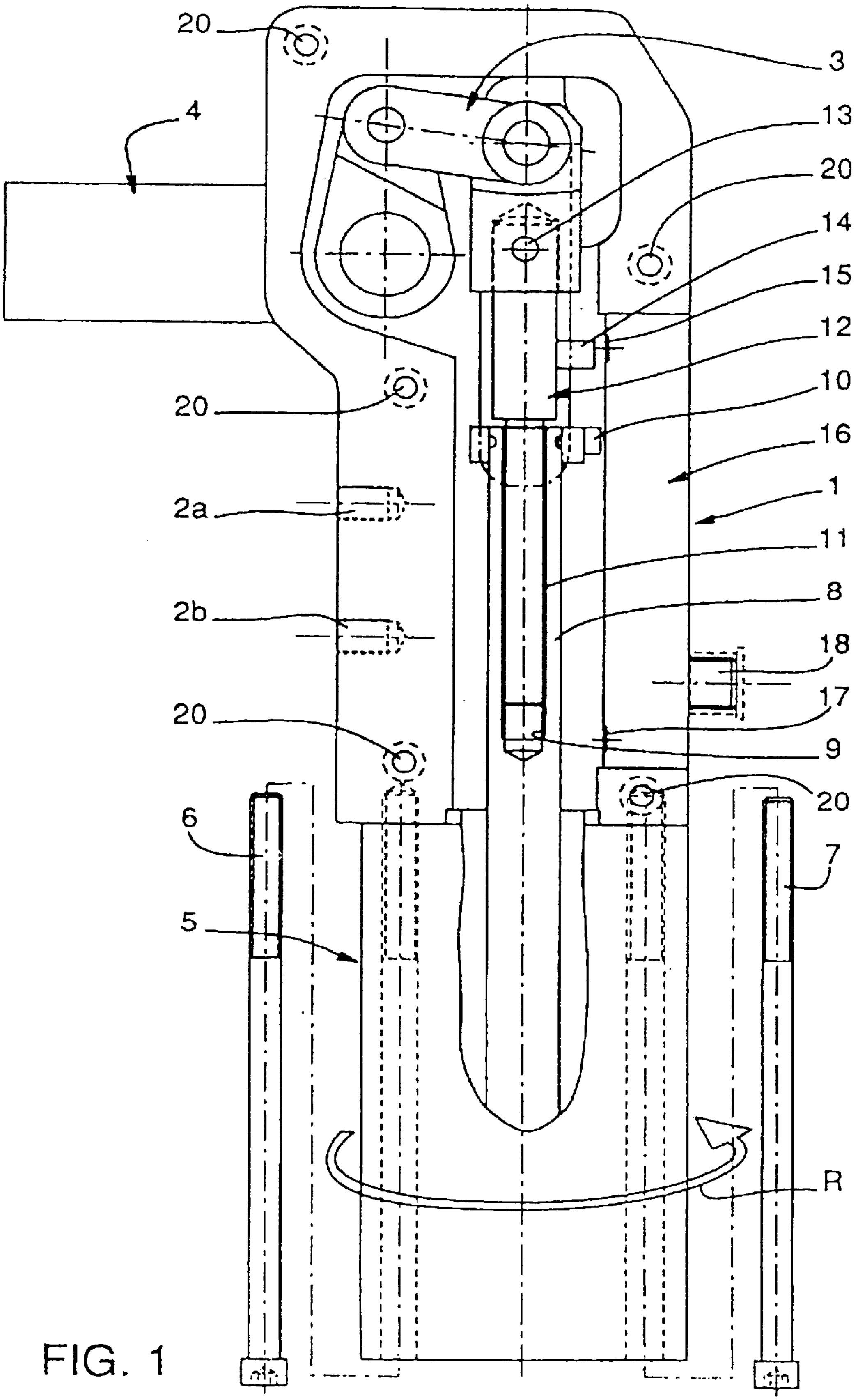
FIG. 1 shows schematically in a side elevational view with parts broken away, a device according to the invention.

With reference to FIGS. 1 to 6, identical elements or functional equivalents are shown by the same reference numerals.

In FIG. 1, a device for clamping or holding comprises a body or a housing 1 secured against impurities, whose cover plate has been removed.

The housing 1 comprises two tappings 2*a*, 2*b* for securement to a support (not shown).

The housing 1 contains a crank shaft and connecting rod assembly 3 acting in the manner of a knee piece to actuate the arm 4 for holding or clamping.

The housing 1 carries on its lower end a jack 5 mounted by means of two screws 6, 7 mounted along the axes 6, 7 on the housing 1. The jack 5 comprises an actuating rod 8 secured preferably to an oblong or rectangular piston, so as to be mounted relative to the body of the jack 5 against rotation.

The rod 8 of the jack 5 comprises internally a tapping 9 and externally a flag 10, preferably of metal.

The tapping 9 of the rod 8 of the jack receives the screw threaded end 11 of a connection member 12 of the rod of the jack 8 with the crank shaft and connecting rod assembly 3. The connection member 12 is mounted secured to the crank shaft and connecting rod assembly 3 by means of an axle 13 ensuring relative non-rotatable mounting between the crank shaft and connecting rod assembly 3 and the connecting member 12. The connecting member 12 also has a flag 14 which is preferably metallic. The flag 14 is freely mounted in rotation to permit rotation of the jack 5. The flag 14 is in a position corresponding to the holding or clamping of a piece of auto body work (not shown) by the arm 4. This holding or clamping position is detected by means of a magnet 15 or an inductive means mounted in a module 16 for inductive detection. Said module 16 also carries another magnet or inductive detection means 17 and an outlet 18 for sealed connection for the connection of a programmable control computer, or other means (not shown) for sequential processing of the operations.

The tappings 20 permit the assembly and the covering of the housing on the principal body of this housing, in a manner known per se.

According to the invention, the movable device or crank shaft and connecting rod assembly 3 is connected to the rod 8 of the actuating means 5 by means of adjustable length, for example by screwing relative to the tapping 9 of the rod 8 about the screw threaded end 11 of the connection member 12.

To this end, the jack 5 is removed from the housing 1 by unscrewing the screw connections 6 and 7, so as to permit a rotation R of the jack 5 in its entirety driving the rod 8 about the screw threaded axle 11.

Figure 2:
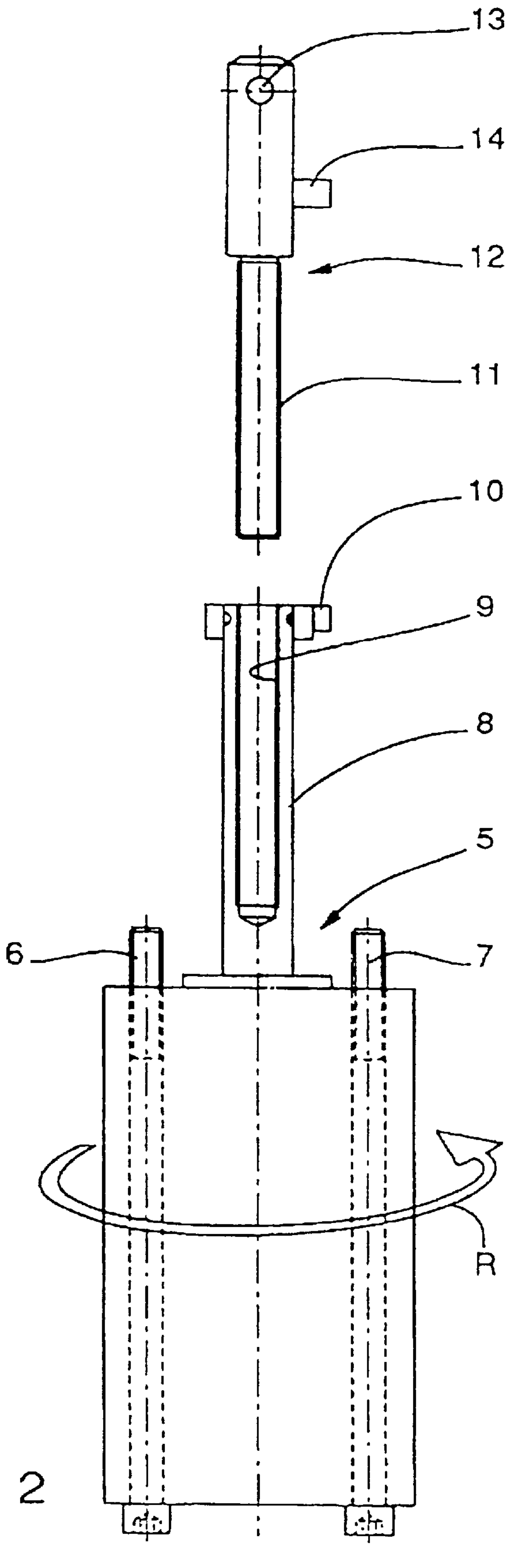
FIG. 2 shows schematically a partial elevational view in partial cross section of a device according to the invention.

With reference to FIG. 2, the operation of the invention is as follows: because of the screw threaded connection between the jack 5 and the connection member 12, and because of the non-rotatable mounting securing on the one hand the member 12 to the movable device 3 by means of the axle 13 and securing the rod 8 to the body of the jack 5, it is possible to obtain a very fine angular adjustment by selecting in a suitable manner the pitch of the screw thread 11 and of the tapping 9 coacting with each other for length adjustment.

For example, for a rod 8 of jack 5 having an external diameter of 16 mm, and an internal tapping 9 of nominal diameter 10 mm with a pitch of 1.5 mm, there can be obtained an incremental adjustment of 1° of angle of rotation of the arm 4 for clamping or holding per half turn of jack 5 about the screwing axis. To permit adjustment by a half turn of the jack, it is provided that the screws 6 and 7 corresponding to the securement on the housing 1 of the jack 5 be symmetrical relative to this screwing axis.

The invention thus permits not only a fine adjustment, but also replacement of the jack 5 without disassembling the device or the movable equipment, because the jack 5 can simply be freed from the device by unscrewing from the tapping 9.

This separation also contributes to decrease of the need for storage, because compatible jacks of different nominal forces can be used in the same housing, and vice versa.

Figure 4:
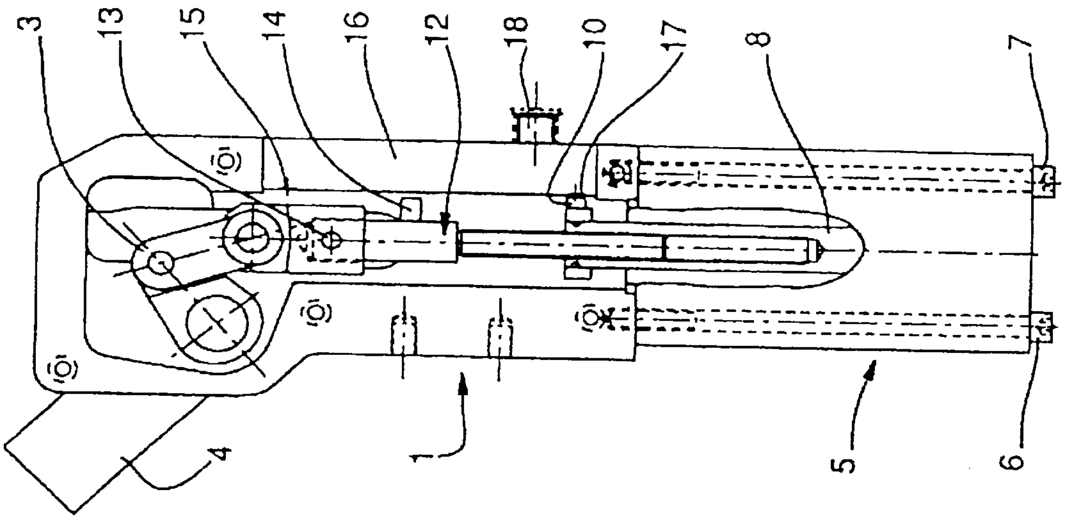
FIGS. 3 and 4 show schematically views similar to FIG. 1 of a device according to the invention adjusted for a perpendicular holding or clamping position and an opening or freeing position at 45°.
Figure 3:
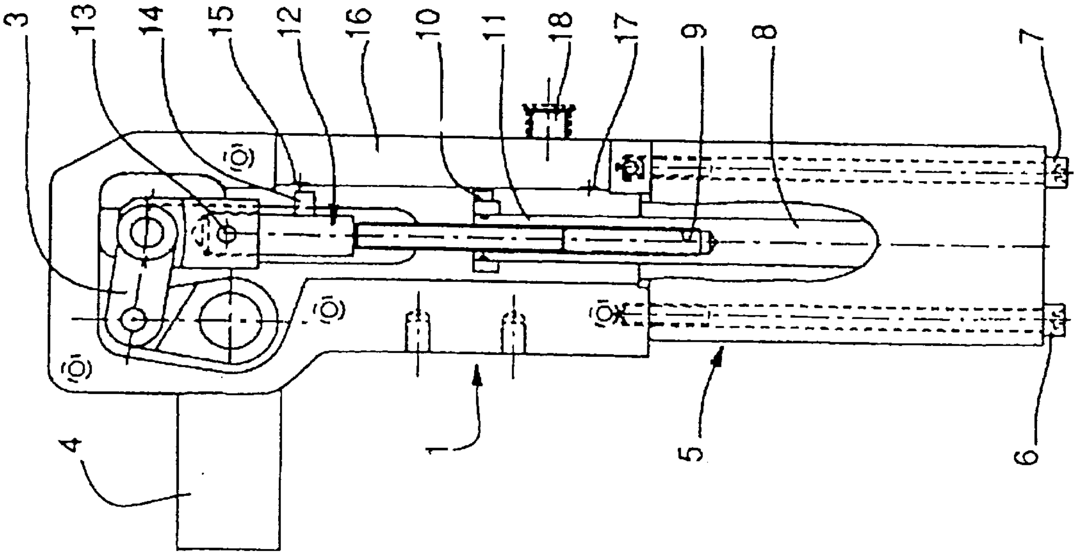

With reference to FIGS. 3 and 4, a device of the type of that described with reference to FIG. 1 is adjusted such that the screwing of the tapping 9 will be carried out substantially at mid-length along the screw threaded rod 11.

This mid-length screwing thus ensures in the position of FIG. 3, the holding or clamping of members (not shown), and this holding or clamping member is detected because of the presence of the metallic flag 14 facing the inductive detection means 15.

Figure 6:
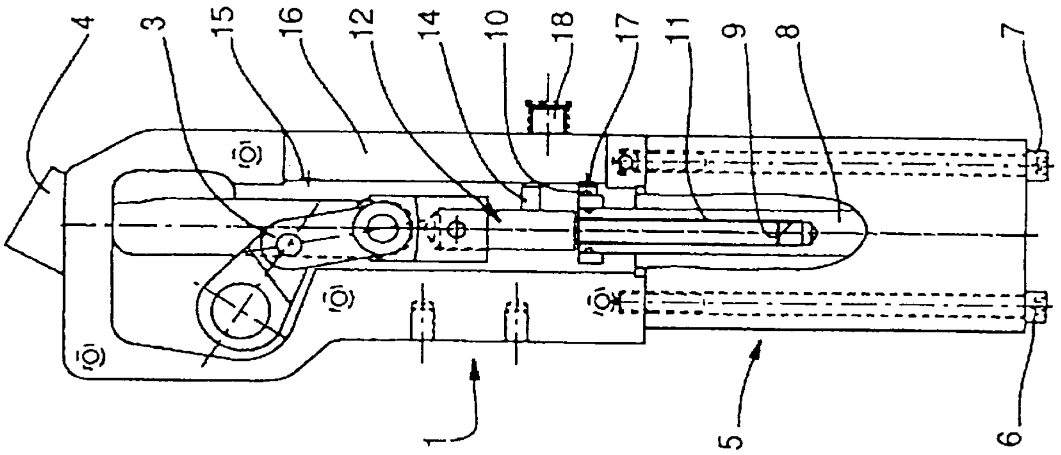
FIGS. 5 and 6 show schematically views similar to FIG. 1 of a device according to the invention adjusted for a perpendicular gripping or holding position and for a position of opening or freeing of 120°.
Figure 5:
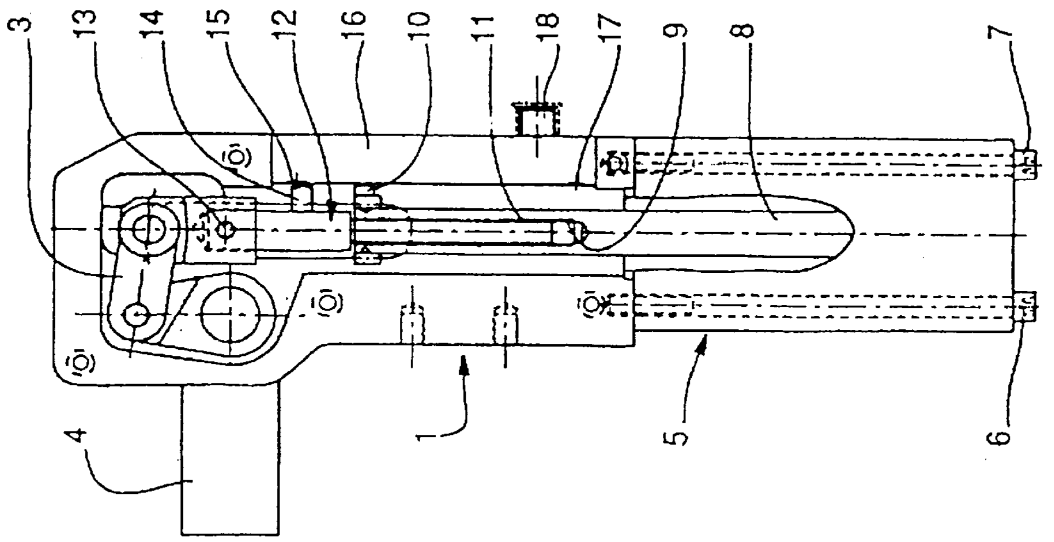

The opening or freeing of the piece to be held or clamped, is carried out in the position of FIG. 4, in which the clamping or holding arm has pivoted through an angle of about 45° upwardly, and in which the detection of the opening or the freeing is carried out by detection of the flag 10 by the inductive detection means 17. with reference to FIGS. 5 and 6, a device analogous to that of FIG. 1 has been adjusted such that the screw threaded rod 11 and the tapping 9 will be screwed practically completely into each other.

The substantially perpendicular position of the clamping or holding arm 4 corresponds to the holding or clamping of members not shown. This holding or clamping position is detected thanks to the presence of the flag 14 secured to the connection member 12 by the inductive detection means 15.

To ensure the freeing of the piece to be held or clamped, the arm 4 pivots substantially through 120° from the position of FIG. 5. This freeing or opening position is detected because of the presence of the flag 10 secured to the rod 8 of the jack 5 opposite the inductive detection means 17 included in the means 15 in the detection module 16 connected to the exterior through the connection passage 18.

The invention thus permits adjusting the clamping or holding positions, the positions of opening or freeing, in a precise manner, without requiring any other intervention than the screwing of the jack 5 in its entirety about the screw threaded rod 11. This simple operation thus permits using the same device for a very wide range of angles or of usable positions.

Moreover, the fact that the adjustment of the length takes place between the two detection flags 10 and 14, permits ensuring automatically the detection of the end positions, by always using the same detection module 16 and by avoiding any adjustment of the position of the inductive detection means 15 and 17 or of the detection flags, or equivalent targets, 10 and 14, secured respectively to the rod 8 and the connection member 12.

The invention described with reference to a particular embodiment is thereby in no way limited, but covers on the contrary any modification or variation within the scope and spirit of the invention, in particular any variation in which the actuating means is not a hydraulic or pneumatic jack, for example a means for transmitting force by cable, by chain, by flexible or rigid connection connected to a remote actuating means.

What is claimed is:

1. Device for holding, positioning or clamping, comprising:

a sealed housing containing a linkage, said linkage being actuated in translation under the action of a reciprocatable actuating means, said linkage transmitting the action of said actuating means to a holding, positioning or clamping member, said linkage being connected to an actuating rod of said reciprocatable actuating means by a connection means adjustable in length, wherein the adjustment in length is obtained by relative screwing between said actuating rod and said linkage, wherein said actuating rod (8) of said reciprocatable actuating means (5) comprises a tapping, said linkage (3) is secured to a connection member (12) screw threaded at one end (11) to permit the adjustment of length by screwing relative to the tapping (9) of said rod (8) about the screw threaded end (11) of the connection member (12), and wherein said actuating rod (8) of said actuating means (5) is mounted in said actuating means (5) by an anti-rotation mounting;

said rod (8) of said actuating means (5) is shaped (10) to coact with a means (17) for detection of the position of freeing or opening;

said actuating rod further (8) carries a flag (14) adapted to be detected by said means for detection (17) secured to the housing (1) of the device, and wherein said means (17) for detection secured to the housing (1) of the device is a contactless detection means.

2. Device for holding, positioning or clamping, comprising:

a sealed housing containing a linkage, said linkage being actuated in translation under the action of a reciprocatable actuating means, said linkage transmitting the action of said actuating means to a holding, positioning or clamping member, said linkage being connected to an actuating rod of said reciprocatable actuating means by a connection means adjustable in length, wherein the adjustment in length is obtained by relative screwing between said actuating rod and said linkage, wherein said actuating rod (8) of said reciprocatable actuating means (5) comprises a tapping, said linkage (3) is secured to a connection member (12) screw threaded at one end (11), to permit the adjustment of length by screwing relative to the tapping (9) of said rod (8) about the screw threaded end (11) of the connection member (12), and wherein said connection member (12) is connected to said linkage (3) by an anti-rotation mounting (13);

said connection member (12) is shaped to coact with a detection means (15) of the position of holding, positioning or clamping; and wherein said detection means (15) is mounted in a detection module (16).

3. Device according to claim 1, wherein said actuating rod (8) of said actuating means (5) is mounted in said actuating means (5) by an anti-rotation mounting;

said actuating rod (8) of said actuating means (5) is shaped (10) to coact with a means (17) for detection of the position of freeing or opening;

said actuating rod (8) further carries a flag (14) adapted to be detected by said means (17) for detection secured to the housing (1) of the device, and wherein said detection means (17) is mounted in a detection module (16).

* * * * *